(12) United States Patent (10) Patent No.: US 8,785,511 B2
Cremer et al. (45) Date of Patent: Jul. 22, 2014

(54) SILICONE-CONTAINING POLYURETHANE FOAM

(75) Inventors: Jens Cremer, Ludwigshafen (DE); Steffen Jungermann, Munich (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 13/991,335

(22) PCT Filed: Dec. 5, 2011

(86) PCT No.: PCT/EP2011/071694
§ 371 (c)(1), (2), (4) Date: Jun. 3, 2013

(87) PCT Pub. No.: WO2012/076439
PCT Pub. Date: Jun. 14, 2012

(65) Prior Publication Data
US 2013/0253085 A1 Sep. 26, 2013

(30) Foreign Application Priority Data
Dec. 6, 2010 (DE) .......................... 10 2010 062 482

(51) Int. Cl.
*C08G 77/26* (2006.01)
(52) U.S. Cl.
USPC ........... 521/154; 521/130; 521/131; 521/132; 521/159; 521/164; 521/167; 521/170; 521/172; 525/474; 528/28; 528/30
(58) Field of Classification Search
USPC ......... 521/130, 131, 132, 154, 159, 164, 167, 521/170, 172; 528/28, 30; 525/474
See application file for complete search history.

(56) References Cited

U.S. PATENT DOCUMENTS

| 3,070,556 | A | 12/1962 | Merten et al. |
| 4,350,777 | A | 9/1982 | Henrichs et al. |
| 6,815,069 | B2 * | 11/2004 | Hohberg et al. ........... 428/423.1 |
| 2005/0131088 | A1 | 6/2005 | Stanjek et al. |
| 2009/0042999 | A1 * | 2/2009 | Lee et al. ......................... 521/82 |
| 2009/0105358 | A1 | 4/2009 | Cremer et al. |
| 2011/0127219 | A1 * | 6/2011 | Hoelzl et al. .................. 210/650 |
| 2013/0005847 | A1 | 1/2013 | Cremer |

FOREIGN PATENT DOCUMENTS

| DE | 102006013416 A1 | 9/2007 |
| DE | 102008041477 A1 * | 2/2010 |
| EP | 0036994 A2 | 10/1981 |
| EP | 1485419 B1 | 12/2004 |
| GB | 2338239 A | 12/1999 |
| WO | 2011113708 A2 | 9/2011 |

* cited by examiner

*Primary Examiner* — John Cooney
(74) *Attorney, Agent, or Firm* — Brooks Kushman P.C.

(57) ABSTRACT

Low density silicone-containing polyurethane foams with excellent surface characteristics are prepared by reacting a foamable composition containing a siloxane of the formula (I)

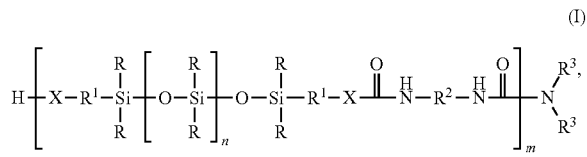

and an isocyanate, in the presence of at least one blowing agent.

11 Claims, No Drawings

SILICONE-CONTAINING POLYURETHANE FOAM

CROSS-REFERENCE TO RELATED APPLICATIONS

This application is the U.S. National Phase of PCT Appln. No. PCT/EP2011/071694 filed Dec. 5, 2011 which claims priority to German Application No. 10 2010 062 482.9 filed Dec. 6, 2010, the disclosures of which are incorporated in their entirety by reference herein.

BACKGROUND OF THE INVENTION

1. Field of the Invention

This invention relates to foamable preparations based on organosilicon compounds, to silicone-containing polyurethane foams, in particular molded foams, having low densities, and also to processes for production thereof.

2. Description of the Related Art

Polyurethane foams are generally prepared by reaction of a polyisocyanate with compounds containing two or more active hydrogen atoms. The compounds containing active hydrogen are typically polyols, primary and secondary polyamines, and water. Between these reactants there are two principal reactions that occur during the preparation of a polyurethane foam. These reactions must in principle run simultaneously and with a competitively balanced rate during the operation, in order to produce a polyurethane foam having desired physical properties. The reaction between the isocyanate and the polyol or polyamine, which is typically termed a gel reaction, leads to the formation of a polymer with a high molecular weight. The progress of this reaction increases the viscosity of the mixture and contributes generally to the formation of crosslinking with polyfunctional polyols. The second principal reaction takes place between the polyisocyanate and water. This reaction contributes to the growth of the urethane polymer and is important for the formation of carbon dioxide gas, which assists the foaming process. Consequently this reaction is often termed the blowing reaction. Both the gel reaction and the blowing reaction take place in foams which are blown partially or completely with carbon dioxide gas. If, for example, the evolution of carbon dioxide is too rapid by comparison with the gel reaction, the foam exhibits a proclivity to collapse. If, alternatively, the gel expansion reaction is too rapid as compared with the blowing reaction that produces carbon dioxide, foam rise is limited, and a high-density foam is produced. Similarly, poorly matched crosslinking reactions will impact adversely on foam stability.

The polyols used are generally polypropylene glycols, which in accordance with the prior art can be prepared in a very wide variety of topologies, and differ from one another in molecular weight, degree of branching, and OH number. In spite of the broad structural variation of these polyols and the associated tailoring of the polyurethane foams to virtually any application, the inherent flammability of the commercially available polyurethane foams is a serious drawback. In spite of great efforts, success has so far not been achieved in establishing absolutely inflammable flexible PU foams on the market, although in recent decades there has been no lack of intense research activities aimed at improving the flame retardancy properties of polymer foams.

One route to flame-retarded, flexible PU foams is taken in silicone-polyurethane flexible foams. In such foams, the highly combustible polyol component that is used in standard PU foams is replaced by incombustible, OH-terminated siloxanes. Through the use of silicone-polyurethane copolymers, i.e., of polysiloxanes, which also contain polyurethane units and/or urea units, it is possible to develop incombustible foam materials of this kind which have new combinations of properties that are tailored precisely to the particular application. Reference on this point may be made, for example, to EP 1485419 B1, which describes the preparation of silicone-polyurethane foams starting from alkylamino- or alkylhydroxy-terminated silicone oils and diisocyanates in what is called a "one-shot" process. Furthermore, DE 102006013416 A1 describes the preparation of silicone-PU foams from prepolymers which are prepared in a solvent-based operation on the basis of alkylamino- or alkylhydroxy-terminated silicone oils and diisocyanates.

A feature which unites the silicone-polyurethane foams that have been described to date is that they are prepared on the basis of siloxanes which are linear or have only very slight, but statistical, branching in the side chains. In view of this linear siloxane chain, the rise phase during foaming is not accompanied by an increase in molar mass, and so the increase in viscosity during the rise phase is relatively slow, meaning that the polymer matrix, even after the end of the blowing reaction, is generally slightly fluid, and, therefore, the fine cell structure may still collapse before curing of the foam is complete. Even if only a small fraction of the cell structure collapses in on itself, the result is a coarse and irregular cell distribution. In order to counteract cell collapse when using linear polyol components, the struts connecting the individual foam cells must not fall below a critical diameter during the rise phase. Hence it is ensured that the still fluid polymatrix is able to counteract the threat of collapse of the foam structure. If, however, the desired foam density selected is too low, then the cell struts become increasingly thin during the rise phase until, finally, they become too flexible to stabilize the cell structure. Accordingly, in general, linear siloxanes result only in silicone-PU foams having densities of distinctly above 100 kg/m$^3$.

A further disadvantage with the silicone-PU foams described to date is that NCO-terminated silicone prepolymers have to be used if silicone-PU foams having low densities are to be obtained. The preparation of appropriate prepolymers requires an additional step of synthesis and, moreover, such prepolymers have but limited stability in storage at elevated temperatures in particular. It would accordingly be desirable to have a process whereby the classic one-shot method can be utilized in foam production. In such a process, the polyol and isocyanate parts would be prepared independently of each other and would only be made to react with each other in the foaming operation.

In addition, the known NCO-terminated silicone prepolymers cannot be used to produce molded foams having optimal properties, since the molded foams obtained therewith have very coarse and irregular cells directly under the skin, creating the haptic impression of inferior quality. It is accordingly desirable to be able to produce silicone-PU foams to the same quality as conventional molded polyurethane foams. For this they need to have a completely uninterrupted and homogeneous surface which transitions directly into the fine-cell structure in their interior.

SUMMARY OF THE INVENTION

The present invention provides foamable compositions containing (A) siloxanes of the formula

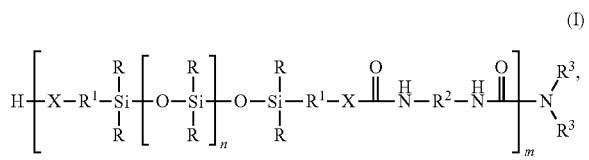

where

R in each occurrence can be the same or different and is a hydrogen atom or a monovalent, optionally substituted hydrocarbon radical, $R^1$ in each occurrence can be the same or different and is a divalent, optionally substituted hydrocarbon radical which can be interrupted by heteroatoms, $R^2$ in each occurrence can be the same or different and is a divalent, optionally substituted hydrocarbon radical which can be interrupted by heteroatoms, $R^3$ in each occurrence can be the same or different and is a hydrogen atom or a monovalent, optionally substituted hydrocarbon radical, X in each occurrence can be the same or different and is —O—, —S— or —$NR^4$—, $R^4$ is a hydrogen atom or a monovalent, optionally substituted hydrocarbon radical, n in each occurrence can be the same or different and is an integer not less than 1, preferably in the range from 1 to 1000, more preferably in the range from 5 to 500 and even more preferably in the range from 5 to 50, and m is an integer not less than 1, preferably in the range from 1 to 20, more preferably in the range from 1 to 10 and even more preferably in the range from 1 to 5, with the proviso that at least one $R^3$ radical in formula (I) is an optionally substituted hydrocarbon radical and has at least one hydroxyl group and/or thiol group, and, (B) polyisocyanates.

DETAILED DESCRIPTION OF THE PREFERRED EMBODIMENTS

Although undepicted in formula (I), up to 1%, preferably up to 0.1%, of all siloxane units may include branching, as in $RSiO_{3/2}$ or $SiO_{4/2}$ units for instance, as a consequence of the process of preparation.

Examples of R are alkyl radicals such as the methyl, ethyl, n-propyl, isopropyl, n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical; alkenyl radicals such as the vinyl and the allyl radicals; cycloalkyl radicals such as the cyclopentyl, cyclohexyl, cycloheptyl and methylcyclohexyl radicals; aryl radicals such as the phenyl and the naphthyl radicals; alkaryl radicals such as the o-, m-, and p-tolyl radicals, xylyl radicals, and ethylphenyl radicals; aralkyl radicals such as the benzyl radical, and the α- and β-phenylethyl radicals.

Examples of substituted hydrocarbon radicals R are alkoxyalkyl radicals, such as the methoxymethyl and ethoxymethyl radicals, hydroxyalkyl radicals such as the 2-hydroxyethyl radicals and aminoalkyl radicals, such as the dimethylaminoethyl, diethylaminomethyl, 2-aminoethyl and N-methylaminoethyl radicals.

The radical R preferably comprises monovalent, optionally substituted hydrocarbon radicals having from 1 to 40 carbon atoms, more preferably hydrocarbon radicals having from 1 to 6 carbon atoms and particularly methyl.

Examples of the $R^1$ radical are methylene, ethylene, propylene, butylene, pentylene, hexamethylene, methyloxyethylene, i.e., the radical —$CH_2$—O—$CH_2CH_2$—, tolylene, methylenebisphenylene, phenylene, naphthylene, cyclohexylene and isophorone radicals.

Preferably $R^1$ comprises divalent, aliphatic hydrocarbon radicals which may be interrupted by heteroatoms, more preferably the propylene, methylene and methyloxyethylene radicals, more preferably methylene and methyloxyethylene radicals, and preferably, methylene.

Examples of radical $R^2$ are the methylene, ethylene, propylene, butylene, pentylene, hexamethylene, methyl-oxyethylene, i.e., the —$CH_2$—O—$CH_2CH_2$— radical, tolylene, methylenebisphenylene, methylenebiscyclohexylene, phenylene, naphthylene, cyclohexylene, 1,3-bis(1-methylethylene)benzene and isophorone radicals.

Preferably $R^2$ comprises divalent, aromatic or aliphatic hydrocarbon radicals, more preferably the tolylene, methylenebisphenylene, methylenebiscyclohexylene, phenylene, naphthylene, cyclohexylene, 1,3-bis(1-methylethylene)benzene and isophorone radicals, more preferably the tolylene, phenylene, 1,3-bis(1-methylethylene)benzene and isophorone radicals and most preferably the tolylene radical.

Examples of $R^3$ are the examples indicated the respect to the radical R and also optionally substituted hydro-carbon radicals having at least one hydroxyl group and/or thiol group, e.g., the hydroxymethyl, 1-hydroxy-ethyl, 2-hydroxyethyl, 1-hydroxypropyl, 2-hydroxy-propyl, 1-hydroxybutyl, thiolmethyl, 1-thiolethyl and 1-thiolpropyl radicals.

Preferably $R^3$ comprises optionally substituted hydro-carbon radicals having at least one hydroxyl group and/or thiol group, more preferably optionally substituted hydrocarbon radicals having at least one hydroxyl group and most preferably hydroxyalkyl radicals having from 1 to 6 carbon atoms.

In the siloxanes (A) of formula (I) which are used according to the present invention, preferably both the $R^3$ radicals bear hydroxyl groups.

X preferably comprises —O—.

Examples of $R^4$ are the examples recited for the radical R. The $R^4$ radical is preferably a hydrogen atom.

The siloxanes (A) of formula (I) preferably have a viscosity of 100 to 10,000 mPas and more preferably 500 to 5000 mPas, all measured at 25° C. according to ASTM D 4283.

Examples of siloxanes (A) used according to the present invention are
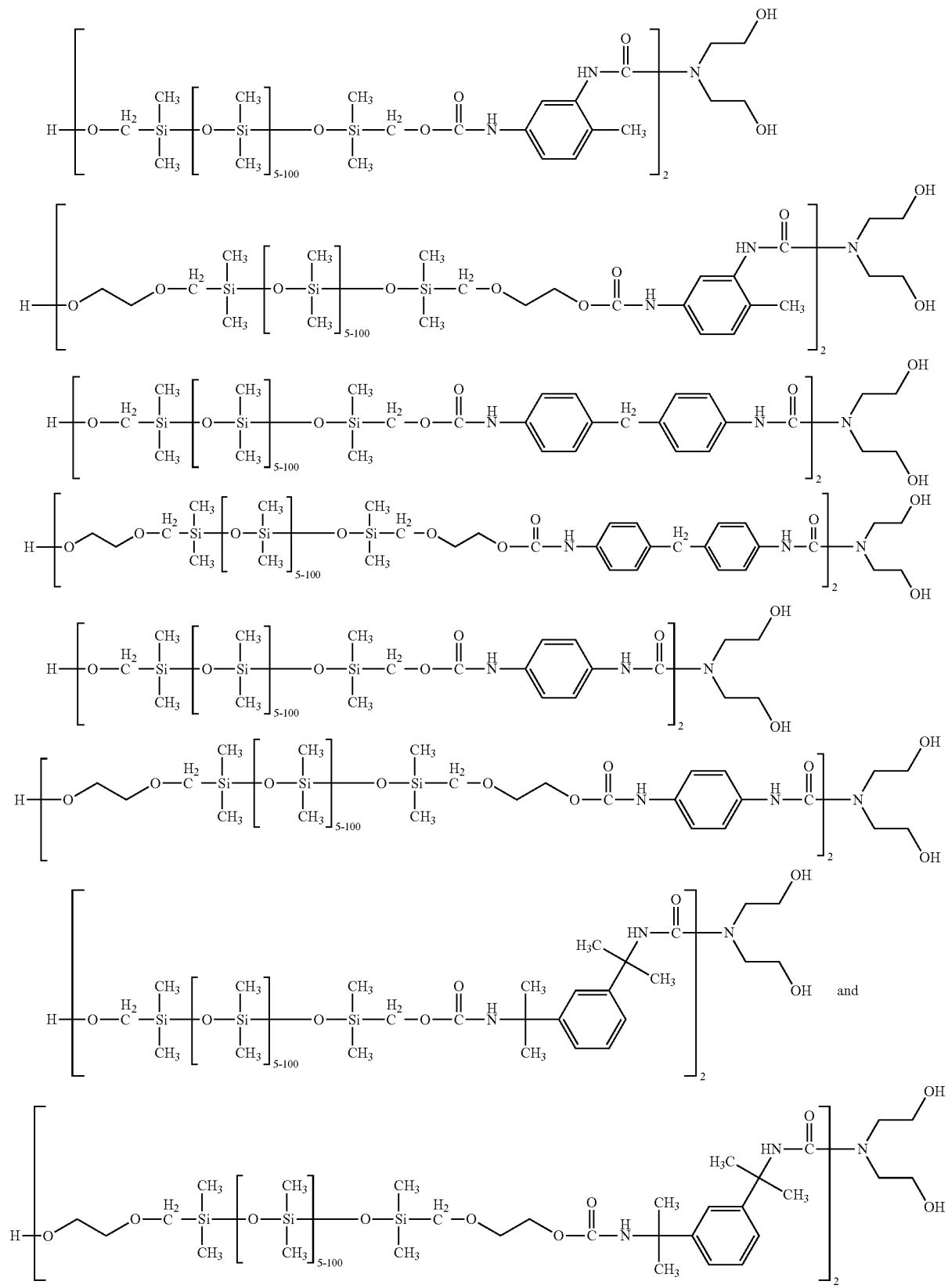

The siloxanes (A) used according to the present invention preferably are:
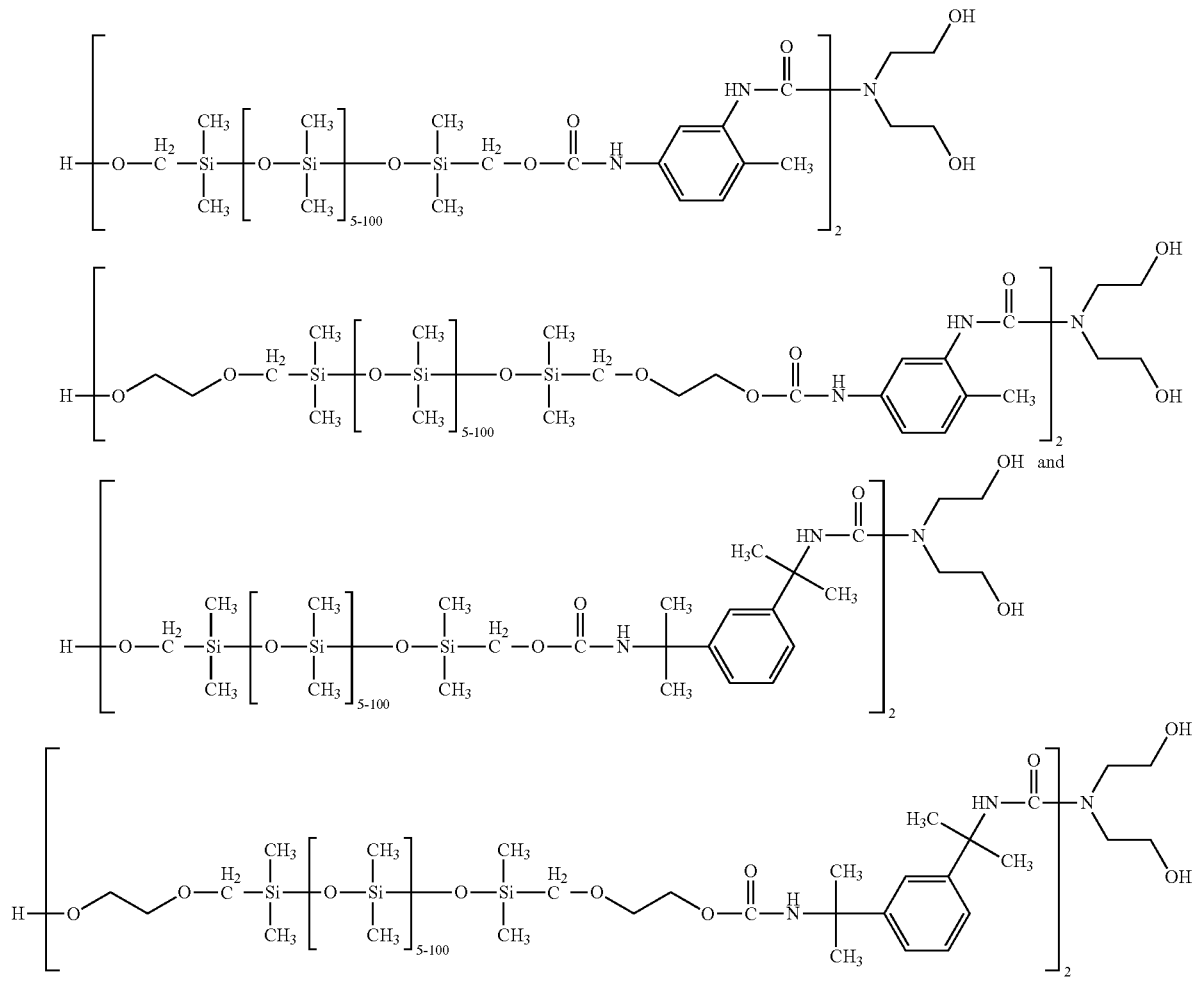
The siloxanes (A) used according to the present invention more preferably are:
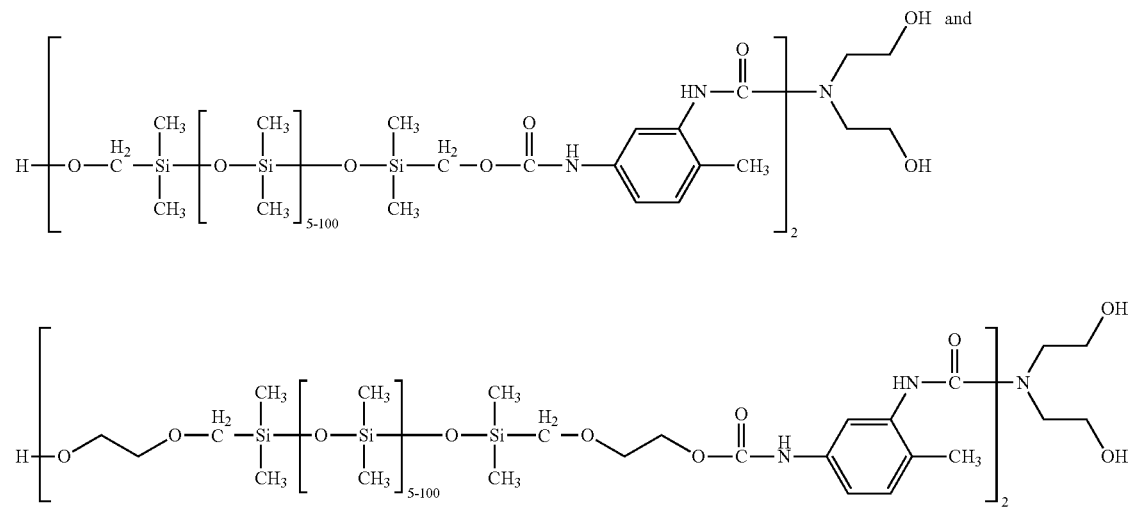

The present invention further provides siloxanes of formula (I) wherein the radicals and indices have one of the meanings mentioned above,
with the proviso that at least one $R^3$ radical in formula (I) is an optionally substituted hydrocarbon radical and has at least one hydroxyl group and/or thiol group.

The siloxanes (A) used according to the present invention are obtainable by commonplace methods in silicon chemistry.

The siloxanes (A) used according to the present invention are preferably obtained by reaction of
(i) a linear amino-, hydroxyl- or thiol-α,ω-functionalized siloxane with
(ii) a diisocyanate and
(iii) an amine.

Component (i) preferably comprises siloxanes of the formula

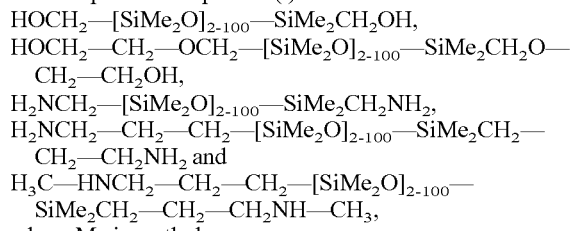

(II)

where R, X and n are each as defined above.

Although not represented in formula (II), the preparation process is such that up to 1%, preferably up to 0.1%, of all units include branching, as in $RSiO_{3/2}$ or $SiO_{4/2}$ units for instance.

Examples of component (i) are
$HOCH_2$—$[SiMe_2O]_{2-100}$—$SiMe_2CH_2OH$,
$HOCH_2$—$CH_2$—$OCH_2$—$[SiMe_2O]_{2-100}$—$SiMe_2CH_2O$—$CH_2$—$CH_2OH$,
$H_2NCH_2$—$[SiMe_2O]_{2-100}$—$SiMe_2CH_2NH_2$,
$H_2NCH_2$—$CH_2$—$CH_2$—$[SiMe_2O]_{2-100}$—$SiMe_2CH_2$—$CH_2$—$CH_2NH_2$ and
$H_3C$—$HNCH_2$—$CH_2$—$CH_2$—$[SiMe_2O]_{2-100}$—$SiMe_2CH_2$—$CH_2$—$CH_2NH$—$CH_3$,
where Me is methyl.

Component (i) preferably comprises
$HOCH_2$—$[SiMe_2O]_{2-100}$—$SiMe_2CH_2OH$ and
$HOCH_2$—$CH_2OCH_2$—$[SiMe_2O]_{2-100}$—$SiMe_2CH_2O$—$CH_2$—$CH_2OH$,
where $HOCH_2$—$[SiMe_2O]_{2-100}$—$SiMe_2CH_2OH$ is particularly preferred.

The siloxanes (i) comprise commercially available products and/or are obtainable by methods commonplace in silicon chemistry.

The diisocyanates (ii) used according to the present invention comprise all known diisocyanates.

Examples of diisocyanates (ii) are diisocyanato-diphenylmethane (MDI), not only in the form of crude or technical MDI but also in the form of pure 4,4' and/or 2,4' isomers or compositions thereof, tolylene diisocyanate (TDI) in the form of its various regioisomers, diisocyanatonaphthalene (NDI), isophorone diisocyanate (IPDI), 1,3-bis(1-isocyanato-1-methyl-ethyl)benzene (TMXDI), 4,4'-diisocyanato-dicyclohexylmethane ($H_{12}$MDI) and hexamethylene diisocyanate (HDI).

In the process of the present invention, diisocyanates (ii) are used in amounts of preferably from 0.1 to 30 parts by weight, more preferably from 0.1 to 20 parts by weight and more particularly from 1 to 10 parts by weight, all based on 100 parts by weight of siloxane (i).

The amines (iii) used according to the present invention preferably comprise those of the formula $HNR^3_2$ (III)

where $R^3$ has one of the abovementioned meanings.

Examples of amines (iii) are ethanolamine, N-methylethanolamine, diethanolamine, N-methylpropanolamine, bis(2-hydroxypropyl)amines, and N-methyl(thio-ethanol)amine.

The amines (iii) preferably comprise aliphatic amines, more preferably diethanolamine, N-methylethanolamine, bis(2-hydroxypropyl)amines and N-methyl(thioethanol)amine and most preferably diethanolamine and bis(2-hydroxypropyl)amines.

According to the present invention, amines (iii) are preferably used in amounts of from 0.1 to 20 parts by weight, more preferably from 0.1 to 10 parts by weight and most preferably from 0.5 to 5 parts by weight, all based on 100 parts by weight of siloxane (i).

When the starting materials (i), (ii) and (iii) are subjected to the reaction, organic solvent (iv) and catalysts (v) may be used.

Examples of organic solvents (iv) are ethers, more particularly aliphatic ethers such as dimethyl ether, diethyl ether, methyl t-butyl ether, diisopropyl ether, dioxane or tetrahydrofuran esters, more particularly aliphatic esters such as ethyl acetate or butyl acetate ketones, more particularly aliphatic ketones such as acetone or methyl ethyl ketone sterically hindered alcohols, more particularly aliphatic alcohols such as t-butanol; amides such as DMF; aliphatic nitriles such as acetonitrile; aromatic hydrocarbons such as toluene or xylene; aliphatic hydrocarbons such as pentane, cyclopentane, hexane, cyclohexane, heptane; and chlorinated hydrocarbons such as methylene chloride or chloroform.

When organic solvents (iv) are used, amounts preferably comprise from 1 to 1000 parts by weight, more preferably from 10 to 500 parts by weight and more particularly from 30 to 200 parts by weight, all based on 100 parts by weight of siloxane (i). The reaction of the present invention preferably utilizes no solvents (iv).

Examples of catalysts (v) are tin compounds such as dibutyltin dilaurate, dioctyltin dilaurate, dibutyltin diacetate, dibutyltin dioctoate, dibutyltin bis(dodecylmercaptide), tin (II) 2-ethylhexanoate and zinc compounds, such as zinc(II) 2-ethylhexanoate and bismuth compounds, such as bismuth (III) neodecanoate and zirconium compounds, such as zirconium tetrakis(2,2,6,6-tetramethylheptane-3,5-dionate) and amines, such as 1,4-diazabicyclo[2,2,2]octane and tetramethylguanidine.

The catalysts (v) preferably comprise tin, zirconium or bismuth compounds, of which bismuth compounds are particularly preferred.

When catalysts (v) are used, the amounts involved preferably range from 1 to 1000 weight ppm, more preferably from 10 to 500 weight ppm and more particularly from 50 to 150 weight ppm, all based on the total weight of the reaction mixture. The reaction of the present invention does preferably utilize catalysts (v).

The components used for the reaction of the present invention may each comprise one type of such a component and also a mixture of two or more types of a particular component.

The process of the present invention preferably comprises a first stage of reacting siloxanes (i) with diisocyanates (ii) in the presence or absence of solvent (iv) and in the presence or absence of catalyst (v) and a second stage of reacting the resulting reaction mixture with amines (iii).

The reaction of the present invention is preferably carried out at temperatures of 10 to 100° C. and more preferably 20 to 80° C.

The reaction of the present invention is preferably carried out at the pressure of the ambient atmosphere, i.e., 900 to 1100 hPa. But it can also be carried out at higher pressures, for example at 1200 to 10,000 hPa.

The reaction of the present invention is preferably carried out under an inert gas atmosphere, such as nitrogen and argon for example.

The reaction mixture obtained after the reaction has ended can be worked up in any desired previously known manner. When a solvent is used in the reaction, it is preferably removed in the workup, which is more preferably done distillatively and—as far as the technical possibilities allow—completely. The reaction mixture preferably does not contain any starting materials any more. When the reaction mixture does contain as yet unreacted starting materials, these preferably remain therein.

Useful isocyanates (B) for the purposes of the present invention include all known di- or polyisocyanates, for example the diisocyanates recited above under (ii), and also polymeric MDI triphenylmethane triisoocyanate or biuret trimers or isocyanurate trimers of the abovementioned isocyanates.

Preference for use as polyisocyanates (B) is given to those of the general formula

$$Q(Nco)_b \quad\quad (IV)$$

where

Q is a b-functional, optionally substituted hydrocarbon radical and b is an integer of at least 2, preferably in the range from 2 to 10, more preferably 2 or 4 and most preferably 2 to 3.

Preferably, Q comprises optionally substituted hydrocarbon radicals having from 4 to 30 carbon atoms and more preferably hydrocarbon radicals having from 6 to 25 carbon atoms.

The preparations of the present invention preferably contain polyisocyanates (B) in amounts of from 0.1 to 150 parts by weight, more preferably from 1 to 100 parts by weight and most preferably from 10 to 50 parts by weight, all based on 100 parts by weight of siloxane (A).

In addition to the siloxanes (A), polyisocyanates (B), the preparations of the present invention may contain further substances, for example fillers (C), emulsifiers (D), physical blowing agents (E), catalysts (F), chemical blowing agents (G) and additives (H).

When fillers (C) are used, the fillers in question may be all nonreinforcing fillers, i.e., fillers having a BET surface area of up to 50 m²/g, such as chalk, or reinforcing fillers, i.e., fillers having a BET surface area of at least 50 m²/g, such as carbon black, precipitated silica or fumed silica. In particular both hydrophobic and hydrophilic fumed silicas represent a preferred filler. One particularly preferred embodiment of the invention uses a hydrophobic fumed silica whose surface has been modified with trimethylsilyl groups. The fillers (C) that are optionally used—more particularly fumed silicas—may take on a variety of functions. Thus they may be used to adjust the viscosity of the foamable mixture. In particular, however, they are able to take on a "support function" in the course of foaming, and thus lead to foams having a better foam structure. Finally, the mechanical properties of the resultant foams may also be decisively improved through the use of fillers (C)-especially through the use of fumed silica. In addition, expandable graphite, inorganic silicates such as wollastonite, talc or glass powder and inorganic phosphates such as calcium hydrogenphosphate or ammonium polyphosphate may also be added as fillers (C).

When the preparations of the invention comprise fillers (C), the amounts in question are preferably 0.1 to 30 parts by weight, more preferably 0.1 to 20 parts by weight, and most preferably 0.1 to 15 parts by weight, all based on 100 parts by weight of siloxane (A). The preparations of the invention do preferably comprise fillers (C).

In many cases it is of advantage to add emulsifiers (D) to the foamable compositions. As suitable emulsifiers (D), which also serve as foam stabilizers, it is possible, for example, to use all commercial silicone oligomers that are modified with polyether side chains and that are also used in producing conventional polyurethane foams.

When emulsifiers (D) are used, the amounts in question are preferably up to 6% by weight, more preferably from 0.3% to 3% by weight, all based on the total weight of the foamable compositions. The preparations of the invention preferably contain no emulsifiers (D).

Moreover, the compositions may also comprise compounds (E) which are able to act as physical blowing agents. As constituent (E) it is preferred to use low molecular mass hydrocarbons such as propane, butane or cyclopentane, dimethyl ether, fluorinated hydrocarbons such as 1,1-difluoroethane or 1,1,1,2-tetrafluoroethane, or $CO_2$. The formation of foam takes place preferably through a reaction of the polyisocyanate (B) with the chemical blowing agent component (G). The use of physical blowing agents (E) in combination with chemical blowing agent constituent (G) may be advantageous, in order to obtain foams having a relatively low density.

When the preparations of the invention comprise constituent (E), the amounts in question are preferably from 0.1 to 30 parts by weight, more preferably 0.1 to 20 parts by weight, and most preferably 0.1 to 15 parts by weight, all based on 100 parts by weight of siloxane (A). The preparations of the invention preferably contain no physical blowing agent (E).

The foamable preparations of the invention may further comprise catalysts (F) which accelerate the curing of the foam. Suitable catalysts (F) include organotin compounds. Examples are dibutyltin dilaurate, dioctyltin dilaurate, dibutyltin diacetate, dibutyltin dioctoate, dibutyltin bis(dodecylmercaptide) or tin(II) 2-ethylhexanoate. Moreover, tin-free catalysts (F) are contemplated as well, such as, for example, heavy-metal compounds or amines. An example of tin-free catalysts is iron(III) acetylacetonate, zinc(II) octoate, zirconium(IV) acetylacetonate and bismuth(III) neodecanoate. Examples of amines are triethylamine, tributylamine, 1,4-diazabicyclo[2.2.2]octane, N,N-bis-(N,N-dimethyl-2-aminoethyl)methylamine, N,N-dimethylcyclohexylamine, N,N-dimethylphenylamine, bis-N,N-dimethylaminoethyl ether, N,N-dimethyl-2-aminoethanol, N,N-dimethylaminopyridine, N,N,N,N-tetramethyl-bis-2-aminoethylmethylamine, 1,5-diazabicyclo[4.3.0]non-5-ene, 1,8-diazabicyclo[5.4.0]undec-7-ene, N-ethyl-morpholine, tetramethylguanidine or N,N'-dimethyl-aminopyridine.

The catalysts (F) may be used individually or as a mixture. If desired, the catalysts used in the preparation of the siloxanes (A) may also serve simultaneously as catalysts (F) for foam curing.

When catalyst (F) is used, the amounts in question are from preferably 0.1% to 6.0% by weight, more preferably from 0.1% to 3.0% by weight, all based on the total weight of the foamable preparation of the invention. The compositions of the invention preferably do comprise catalysts (F).

As chemical blowing agents (G) it is possible in principle for not only water but also all compounds having preferably at least one isocyanate-reactive function to be used.

Examples of constituent (G) are aminoalkyl- or hydroxy-functional siloxanes other than component (A), monomeric alcohols, monomeric diols such as glycol, propanediol and butanediol, monomeric oligools such as pentaerythritol or trihydroxymethylethane, oligomeric or polymeric alcohols having one, two or more hydroxyl groups such as ethylene glycols or propylene glycols, water, monomeric amines having one, two or more amine functions such as ethylenediamine, hexamethylene-diamine, and also oligomeric or polymeric amines having one, two or more amine functions.

When constituent (G) is used, it preferably comprises hydroxy compounds, with water being particularly preferred.

When constituent (G) is used, the amounts are preferably 0.1 to 20 parts by weight, more preferably from 0.1 to 15 parts by weight, and most preferably from 0.1 to 10 parts by weight, all based on 100 parts by weight of siloxane (A). The compositions of the invention preferably do comprise constituent (G).

Examples of optional additives (H) are cell regulators, plasticizers, for example silicone oils which are different from component (A), flame retardants, for example melamine or phosphorus-containing compounds, especially phosphates and phosphonates, and also halogenated polyesters and polyols or chlorinated paraffins.

Examples of silicone oils (H) are triorganosiloxy-terminated polydiorganosiloxanes, such as trimethylsiloxy-terminated polydimethylsiloxanes, and the siloxanes mentioned above under i).

The additives (H) preferably comprise cell regulators and flame retardants, of which flame retardants are particularly preferred.

When additives (H) are used, the amounts involved preferably range from 0.1 to 30 parts by weight, more preferably from 0.1 to 20 parts by weight and most preferably from 0.1 to 15 parts by weight, all based on 100 parts by weight of siloxane (A). The preparations of the present invention preferably contain no additives (H).

Preferably, the compositions of the present invention contain no silicone resins where silicone resins are siloxanes where more than 50% of all siloxane units have the meaning of T-units ($-SiO_{3/2}$) and Q-units ($SiO_{4/2}$).

The components of the foamable preparation which are used according to the present invention may each comprise one type of such a component and also a mixture of two or more types of a particular component.

The preparations of the present invention preferably comprise those containing
(A) organosiloxanes,
(B) polyisocyanates,
optionally
(C) fillers,
optionally
(D) emulsifiers,
optionally
(E) physical blowing agents,
optionally
(F) catalysts,
optionally
(G) chemical blowing agents, and
optionally
(H) additives,
wherein the preparations according to the invention contain at least one blowing agent selected from components (E) and (G), more particularly at least (G).

Aside from components (A) and (B) and also optionally one or more of components (C) to (H), the preparations of the present invention preferably do not contain any further constituents.

The preparations of the present invention are obtainable, then, in any desired conventional manner, such as simply mixing the individual components together, although pre-mixtures of individual constituents can also be prepared. It is preferable to prepare 2-part systems, wherein the two parts of the foamable preparation of the present invention contain all the constituents in any desired combinations and mixing ratios, with the proviso that one part does not simultaneously contain siloxanes (A) and polyisocyanates (B) and/or the constituents (B) and (G).

The present invention further provides a process for producing the preparations of the present invention, characterized in that 2-part systems are produced, wherein the two parts of the foamable preparation contain all the constituents in any desired combinations and mixing ratios, with the proviso that one part does not simultaneously contain siloxanes (A) and polyisocyanates (B) and/or the constituents (B) and (G).

For instance, the preparation of the present invention is preferably obtained by preparing a mixture containing constituent (A), optionally constituent (C), optionally constituent (D), optionally constituent (E), optionally constituent (F), optionally constituent (G) and optionally constituent (H) as part 1 and also a part 2 containing constituent (B) and these parts are then mixed together to obtain the foam of the present invention.

The preparations of the present invention are preferably liquid to highly viscous and preferably have a viscosity of 250 to 10,000 mPas and more preferably 500 to 5000 mPas, all measured at 25° C. as per ASTM D 4283.

The preparations of the present invention are preferably used in the manufacture of foams, more preferably rigid or flexible foams and most preferably flexible foams.

The present invention further provides a process for preparing a silicone-containing polyurethane foam, characterized in that a siloxane (A), a polyisocyanate (B) and at least one blowing agent are mixed and allowed to react.

In one preferred embodiment of the process according to the present invention, siloxane (A), polyisocyanate (B), catalyst (F) and chemical blowing agent (G) and also optionally component (C) are mixed together and allowed to react directly thereafter.

In the process of the present invention, the foamable composition is preferably introduced into a mold which is subsequently closed such that the overpressure produced in foaming can escape. This can be realized for example by the mold having an overpressure valve or small openings, i.e., being incompletely closed via one or more narrow slots for example.

The molds used in the process of the present invention can be any kind of molds useful for producing molded foams. Examples of molds of this type are sealable and heatable metallic molds which are equipped with an overpressure valve to allow the displaced air to escape during the foaming process.

Preferably, the molds used according to the present invention are heatable molds composed of a solid material of construction, for example fiberglass-reinforced polyester or epoxy resins and also metals, such as steel or aluminum, in which case molds composed of steel and aluminum are preferably hydrophobicized with a priming paste, preferably once before use.

Examples of priming pastes with which the molds used in the process of the present invention can be hydro-phobicized are high-melting waxes based on hydrocarbons, for example as commercially available from Chem-Trend Deutschland GmbH, D-Maisach under the trade name of Klüberpur 55-0005.

If desired, the molds can be wetted with a release agent to ensure better demoldability of the foamed structures produced.

Examples of such release agents are high-melting waxes dissolved in hydrocarbons, for example as available from Chem-Trend Deutschland GmbH, D-Maisach under the trade name of Klüberpur 41-0057.

The process of the present invention preferably utilizes the molds used without release agent.

The molds used in the process of the present invention are adjusted to temperatures of preferably 0 to 150° C., more preferably 10 to 100° C. and especially 40 to 80° C.

In the process of the present invention, the expansion of the foam in the course of its formation is limited by the mold used, i.e., the mold is "overpacked". This overpacking typically amounts to between 20% by volume and 100% by volume. Typical fill levels for a target foam density of 50 kg/m$^3$ amount to about 5% by volume.

The heat formed in the course of the reaction according to the present invention preferably remains in the system and contributes to foam formation. The process of the present invention reaches reaction temperatures up to preferably from 50 to 150° C. in the foam core.

The process of the present invention is preferably carried out at the pressure of the ambient atmosphere, i.e., about 900 to 1100 hPa.

The process of the present invention preferably releases $CO_2$ which is very largely responsible for the building of the foam structure of the present invention.

In the process of the present invention, the demolding time, i.e., the time from filling the mold to removing the molded foam from the mold, is preferably in the range from 1 to 20 minutes, more preferably in the range from 2 to 15 minutes and especially in the range from 3 to 10 minutes.

The process of the present invention provides partially closed-cell foams which, by applying an external pressure, can be converted into completely open-cell foams, as for example by mechanically compressing the foamed structures as the foamed structure passes through two directly adjacent freely rotating rolls to compress the foamed structure to preferably above 75%.

The present invention further provides foams obtainable by reaction of siloxanes (A) with polyisocyanate (B) and at least one blowing agent.

The foams of the present invention are notable for a fine, open-cell foam structure. Their mechanical properties are equivalent to those of commercially available PU foams.

The molded foams of the present invention preferably have a density of 10 to 500 kg/m$^3$, more preferably 15 to 200 kg/m$^3$ and more particularly 20 to 120 kg/m$^3$, all determined at 25° C. and 1013 hPa.

The molded foams of the present invention have the advantage of having compact, defect-free and homogeneous outside surfaces.

The present compositions and also the present process for foam production have the advantage that no release agents are required.

The foamable preparations of the present invention have the advantage of being very simple to process using existing methods from PU technology.

The preparations of the present invention further have the advantage that they are obtainable using starting materials that are readily available commercially.

The preparations of the present invention additionally have the advantage that they are obtainable without adding a solvent, so their method of making does not generate any solvent residues and can save time and money in eliminating the need for solvent removal.

The preparations of the present invention further have the advantage that they are easy to process and are obtainable with low viscosity.

The preparations of the present invention have the advantage that silicone-polyurethane foams of low densities are obtainable by the one-shot method.

The present invention process for producing silicone-containing PU foams has the advantage of being simple to carry out.

The foams of the present invention further have the advantage of being flexible and of extremely low flammability.

The foams of the present invention further have the advantage of having high mechanical strengths, particularly combined with low foam densities.

The foams of the present invention are usable wherever polyurethane foams have been used to date. More particularly, they are useful for upholstery.

In the examples below, all parts and percentage data, unless indicated otherwise, are by weight. Unless indicated otherwise, the examples below are carried out under the pressure of the ambient atmosphere, in other words at about 1000 hPa, and at room temperature, in other words about 20° C., or at a temperature which comes about when the reactants are combined at room temperature without additional heating or cooling. All of the viscosity data given in the examples are intended to be based on a temperature of 25° C.

In the examples, the following ingredients were used:

MDI: polymeric MDI having a functionality of 2.9 (commercially available from Huntsman Polyurethanes, Deggendorf, Germany, under the name Suprasec® 2085);

tolylene diisocyanate: mixture of 2,4- and 2,6-tolylene diisocyanate in a ratio of 80:20 (commercially available from Bayer MaterialScience AG, Leverkusen, Germany, under the name of Desmodur® T80);

TMXDI: 1,3-bis(1-isocyanato-1-methylethyl)benzene (commercially available from Sigma-Aldrich Chemie GmbH, Munich, Germany)

amine catalyst: diazabicyclooctane (commercially available from Air Products GmbH, Hamburg, Germany, under the name DABCO® Crystal);

expandable graphite: exfoliation graphite having a minimum expansion rate of 350 cm$^3 \cdot$g$^{-1}$ at a starting temperature of 250° C. (commercially available from Graphit Kropfmühl AG, Hauzenberg, Germany, under the name ES 350 F5);

wollastonite: surface-modified acicular wollastonite having an aspect ratio of 6:1 (commercially available from Quarzwerke GmbH, Frechen, Germany, under the name Tremin 939-304);

calcium hydrogenphosphate: commercially available from Sigma-Aldrich Chemie GmbH, Munich, Germany The mold used in the examples which follow has dimensions of 40 cm×20 cm×5 cm and before use was hydrophobicized once with 25 g of priming paste bearing the designation "Klüberpur 55-0005" from Chem-Trend Deutschland GmbH, Maisach, Germany.

COMPARATIVE EXAMPLE 1

200.00 g of a linear organopolysiloxane of the formula $HO-CH_2-[Si(CH_3)_2O]_{29}Si(CH_3)_2-CH_2-OH$ and 12.8 g of MDI were reacted in 400 ml of absolute acetone under an atmosphere of argon. The reaction was catalyzed with 60 mg of bismuth(III) neodecanoate and stirred at 50° C. After a reaction time of one hour, first 2.5 g of N-methylethanolamine were gradually added dropwise and then the reaction mixture thus obtained was freed of solvent at a pressure of 10 hPa.

200.0 g of the hyperbranched organopolysiloxane thus obtained were initially emulsified with 500 mg of diazabicyclooctane and 5.1 g of water into a homogeneous mixture using a high-speed stirrer and then 54.4 g of tolylene diisocyanate were added to this emulsion and incorporated with a high-speed stirrer for 10 s. Of the mixture thus obtained, 200 g were immediately introduced into a 4 L aluminum mold temperature controlled to 70° C. and the mold was closed for a period of 10 min except for a 100 μm wide and 40 cm long slot to allow the displaced air to escape. After a demolding time of 10 min, a silicone-PU foam having a density of 50 kg/m$^3$ was obtained with a distinctly visible inhomogeneous surface.

COMPARATIVE EXAMPLE 2

200.00 g of a linear organopolysiloxane of the formula HO—CH$_2$—[Si(CH$_3$)$_2$O]$_{29}$Si(CH$_3$)$_2$—CH$_2$—OH and 12.1 g of MDI were reacted in 400 ml of absolute acetone under an atmosphere of argon. The reaction was catalyzed with 60 mg of bismuth(III) neodecanoate and stirred at 50° C. After a reaction time of one hour, first 3.0 g of diethanolamine were gradually added dropwise and then the reaction mixture thus obtained was freed of solvent at a pressure of 10 hPa.

200.0 g of the hyperbranched organopolysiloxane thus obtained were initially emulsified with 500 mg of diazabicyclooctane and 5.1 g of water into a homogeneous mixture using a high-speed stirrer and then 56.7 g of tolylene diisocyanate were added to this emulsion and incorporated with a high-speed stirrer for 10 s. Of the mixture thus obtained, 200 g were immediately introduced into a 4 L aluminum mold temperature controlled to 70° C. and the mold was closed for a period of 10 min except for a 100 μm wide and 40 cm long slot to allow the displaced air to escape. After a demolding time of 10 min, a silicone-PU foam having a density of 50 kg/m$^3$ was obtained. Compared with the foam of Comparative Example 1, a significantly more homogeneous surface was visible here, yet the foam surface still had an irregular texture.

INVENTIVE EXAMPLE 1

20.00 g of a linear organopolysiloxane of the formula HO—CH$_2$—[Si(CH$_3$)$_2$—O]$_{29}$Si(CH$_3$)$_2$—CH$_2$—OH and 12.3 g of tolylene diisocyanate were reacted in 100 ml of absolute acetone under an atmosphere of argon. The reaction was catalyzed with 60 mg of bismuth(III) neodecanoate and stirred at 50° C. After a reaction time of 30 min, first 5.0 g of diethanolamine were gradually added dropwise and then the reaction mixture thus obtained was freed of solvent at a pressure of 10 hPa.

180.0 g of the organopolysiloxane thus obtained were initially emulsified with 600 mg of diazabicyclooctane, and 6.30 g of water into a homogeneous mixture using a high-speed stirrer and then 65.4 g of tolylene diisocyanate were added to this emulsion and incorporated with a high-speed stirrer for 10 s. Of the mixture thus obtained, 200 g were immediately introduced into a 4 L aluminum mold temperature controlled to 70° C. and the mold was closed for a period of 10 min except for a 100 μm wide and 40 cm long slot to allow the displaced air to escape. After a demolding time of 10 min, a silicone-PU foam having a density of 50 kg/m$^3$ with a homogeneous and defect-free surface was obtained.

INVENTIVE EXAMPLE 2

200.00 g of a linear organopolysiloxane of the formula HO—CH$_2$—[Si(CH$_3$)$_2$—O]$_{29}$Si(CH$_3$)$_2$—CH$_2$—OH and 12.3 g of tolylene diisocyanate were reacted without solvent under an atmosphere of argon. The reaction was catalyzed with 20 mg of bismuth(III) neodecanoate and stirred at 50° C. After a reaction time of 30 min, first 5.0 g of diethanolamine were gradually added dropwise and then the reaction mixture thus obtained was cooled to room temperature.

180.0 g of the organopolysiloxane thus obtained were initially emulsified with 600 mg of diazabicyclooctane and 6.30 g of water into a homogeneous mixture using a high-speed stirrer and then 65.4 g of tolylene diisocyanate were added to this emulsion and incorporated with a high-speed stirrer for 10 s. Of the mixture thus obtained, 200 g were immediately introduced into a 4 L aluminum mold temperature controlled to 70° C. and the mold was closed for a period of 10 min except for a 100 μm wide and 40 cm long slot to allow the displaced air to escape. After a demolding time of 10 min, a silicone-PU foam having a density of 50 kg/m$^3$ with a homogeneous and defect-free surface was obtained.

INVENTIVE EXAMPLE 3

200.00 g of a linear organopolysiloxane of the formula HO—CH$_2$—[Si(CH$_3$)$_2$O]$_{29}$Si(CH$_3$)$_2$—CH$_2$—OH and 12.3 g of tolylene diisocyanate were reacted without solvent under an atmosphere of argon. The reaction was catalyzed with 20 mg of bismuth(III) neodecanoate and stirred at 50° C. After a reaction time of 30 min, first 5.0 g of diethanolamine were gradually added dropwise and then the reaction mixture thus obtained was cooled to room temperature.

180.0 g of the organopolysiloxane thus obtained were initially emulsified with 600 mg of diazabicyclooctane and 7.20 g of water into a homogeneous mixture using a high-speed stirrer and then 73.2 g of tolylene diisocyanate were added to this emulsion and incorporated with a high-speed stirrer for 10 s. Of the mixture thus obtained, 180 g were immediately introduced into a 4 L aluminum mold temperature controlled to 70° C. and the mold was closed for a period of 10 min except for a 100 μm wide and 40 cm long slot to allow the displaced air to escape. After a demolding time of 10 min, a silicone-PU foam having a density of 45 kg/m$^3$ with a homogeneous and defect-free surface was obtained.

INVENTIVE EXAMPLE 4

200.00 g of a linear organopolysiloxane of the formula HO—CH$_2$—[Si(CH$_3$)$_2$—O]$_{29}$Si(CH$_3$)$_2$—CH$_2$—OH and 12.3 g of tolylene diisocyanate were reacted without solvent under an atmosphere of argon. The reaction was catalyzed with 20 mg of bismuth(III) neodecanoate and stirred at 50° C. After a reaction time of 30 min, first 6.0 g of diethanolamine were gradually added dropwise and then the reaction mixture thus obtained was cooled to room temperature.

180.0 g of the organopolysiloxane thus obtained were initially emulsified with 600 mg of diazabicyclooctane and 6.30 g of water into a homogeneous mixture using a high-speed stirrer and then 67.2 g of toluene diisocyanate were added to this emulsion and incorporated with a high-speed stirrer for 10 s. Of the mixture thus obtained, 200 g were immediately introduced into a 4 L aluminum mold temperature controlled

INVENTIVE EXAMPLE 5

200.00 g of a linear organopolysiloxane of the formula HO—CH$_2$—[Si(CH$_3$)$_2$—O]$_{29}$Si(CH$_3$)$_2$—CH$_2$—OH and 12.3 g of tolylene diisocyanate were reacted without solvent under an atmosphere of argon. The reaction was catalyzed with 20 mg of bismuth(III) neodecanoate and stirred at 50° C. After a reaction time of 30 min, first 6.0 g of diethanolamine were gradually added dropwise and then the reaction mixture thus obtained was cooled to room temperature.

180.0 g of the organopolysiloxane thus obtained were initially emulsified with 600 mg of diazabicyclooctane and 7.20 g of water into a homogeneous mixture using a high-speed stirrer and then 75.0 g of tolylene diisocyanate were added to this emulsion and incorporated with a high-speed stirrer for 10 s. Of the mixture thus obtained, 200 g were immediately introduced into a 4 L aluminum mold temperature controlled to 70° C. and the mold was closed for a period of 10 min except for a 100 μm wide and 40 cm long slot to allow the displaced air to escape. After a demolding time of 10 min, a silicone-PU foam having a density of 45 kg/m$^3$ with a homogeneous and defect-free surface was obtained.

INVENTIVE EXAMPLE 6

200.00 g of a linear organopolysiloxane of the formula HO—CH$_2$—[Si(CH$_3$)$_2$—O]$_{37}$Si(CH$_3$)$_2$—CH$_2$—OH and 9.8 g of tolylene diisocyanate were reacted without solvent under an atmosphere of argon. The reaction was catalyzed with 20 mg of bismuth(III) neodecanoate and stirred at 50° C. After a reaction time of 30 min, first 5.4 g of diethanolamine were gradually added dropwise and then the reaction mixture thus obtained was cooled to room temperature.

180.0 g of the organopolysiloxane thus obtained were initially emulsified with 600 mg of diazabicyclooctane and 7.20 g of water into a homogeneous mixture using a high-speed stirrer and then 74.6 g of tolylene diisocyanate were added to this emulsion and incorporated with a high-speed stirrer for 10 s. Of the mixture thus obtained, 200 g were immediately introduced into a 4 L aluminum mold temperature controlled to 70° C. and the mold was closed for a period of 10 min except for a 100 μm wide and 40 cm long slot to allow the displaced air to escape. After a demolding time of 10 min, a silicone-PU foam having a density of 45 kg/m$^3$ with a homogeneous and defect-free surface was obtained.

INVENTIVE EXAMPLE 7

200.00 g of a linear organopolysiloxane of the formula HO—CH$_2$—[Si(CH$_3$)$_2$—O]$_{37}$Si(CH$_3$)$_2$—CH$_2$—OH and 9.8 g of tolylene diisocyanate were reacted without solvent under an atmosphere of argon. The reaction was catalyzed with 20 mg of bismuth(III) neodecanoate and stirred at 50° C. After a reaction time of 30 min, first 5.4 g of diethanolamine were gradually added dropwise and then the reaction mixture thus obtained was cooled to room temperature.

160.0 g of the organopolysiloxane thus obtained were initially emulsified with 600 mg of diazabicyclooctane and 6.40 g of water into a homogeneous mixture using a high-speed stirrer and then 20.0 g of expandable graphite and 66.3 g of tolylene diisocyanate were added to this emulsion and incorporated with a high-speed stirrer for 10 s. Of the mixture thus obtained, 200 g were immediately introduced into a 4 L aluminum mold temperature controlled to 70° C. and the mold was closed for a period of 10 min except for a 100 μm wide and 40 cm long slot to allow the displaced air to escape. After a demolding time of 10 min, a gray silicone-PU foam having a density of 45 kg/m$^3$ with a homogeneous and defect-free surface was obtained.

INVENTIVE EXAMPLE 8

200.00 g of a linear organopolysiloxane of the formula HO—CH$_2$—[Si(CH$_3$)$_2$—O]$_{37}$Si(CH$_3$)$_2$—CH$_2$—OH and 9.8 g of tolylene diisocyanate were reacted without solvent under an atmosphere of argon. The reaction was catalyzed with 20 mg of bismuth(III) neodecanoate and stirred at 50° C. After a reaction time of 30 min, first 5.4 g of diethanolamine were gradually added dropwise and then the reaction mixture thus obtained was cooled to room temperature.

160.0 g of the organopolysiloxane thus obtained were initially emulsified with 600 mg of diazabicyclooctane and 6.40 g of water into a homogeneous mixture using a high-speed stirrer and then 10.0 g of expandable graphite, 10.0 g of wollastonite and 66.3 g of tolylene diisocyanate were added to this emulsion and incorporated with a high-speed stirrer for 10 s. Of the mixture thus obtained, 200 g were immediately introduced into a 4 L aluminum mold temperature controlled to 70° C. and the mold was closed for a period of 10 min except for a 100 μm wide and 40 cm long slot to allow the displaced air to escape. After a demolding time of 10 min, a gray silicone-PU foam having a density of 45 kg/m$^3$ with a homogeneous and defect-free surface was obtained.

INVENTIVE EXAMPLE 9

200.00 g of a linear organopolysiloxane of the formula HO—CH$_2$—[Si(CH$_3$)$_2$—O]$_{37}$Si(CH$_3$)$_2$—CH$_2$—OH and 13.7 g of TMXDI were reacted without solvent under an atmosphere of argon. The reaction was catalyzed with 50 mg of bismuth(III) neodecanoate and stirred at 50° C. After a reaction time of 30 min, first 5.4 g of diethanolamine were gradually added dropwise and then the reaction mixture thus obtained was cooled to room temperature.

160.0 g of the organopolysiloxane thus obtained were initially emulsified with 600 mg of diazabicyclooctane and 6.40 g of water into a homogeneous mixture using a high-speed stirrer and then 10.0 g of expandable graphite, 5.0 g of wollastonite and 5.0 g of calcium hydrogenphosphate and 66.1 g of tolylene diisocyanate were added to this emulsion and incorporated with a high-speed stirrer for 10 s. Of the mixture thus obtained, 200 g were immediately introduced into a 4 L aluminum mold temperature controlled to 70° C. and the mold was closed for a period of 10 min except for a 100 μm wide and 40 cm long slot to allow the displaced air to escape. After a demolding time of 10 min, a gray silicone-PU foam having a density of 45 kg/m$^3$ with a homogeneous and defect-free surface was obtained.

The invention claimed is:

1. A foamable composition, comprising
   (A) at least one siloxane of the formula

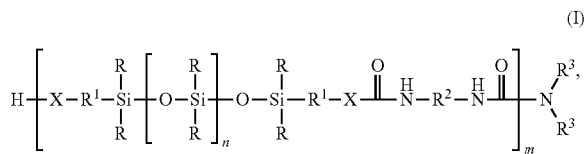

(I)

where
   R in each occurrence is the same or different and is hydrogen or a monovalent, optionally substituted hydrocarbon radical,
   $R^1$ in each occurrence is the same or different and is a divalent, optionally substituted hydrocarbon radical optionally interrupted by heteroatoms,
   $R^2$ in each occurrence is the same or different and is a divalent, optionally substituted hydrocarbon radical optionally interrupted by heteroatoms,
   $R^3$ in each occurrence is the same or different and is hydrogen or a monovalent, optionally substituted hydrocarbon radical,
   X in each occurrence is the same or different and is —O—, —S— or —$NR^4$—,
   $R^4$ is hydrogen or a monovalent, optionally substituted hydrocarbon radical,
   n is the same or different and is an integer not less than 1, and
   m is an integer not less than 1,
   with the proviso that at least one $R^3$ radical in formula (I) is an optionally substituted hydrocarbon radical having at least one hydroxyl group and/or thiol group, and
   (B) a polyisocyanate.

2. The foamable composition of claim 1, wherein X is —O—.

3. The foamable composition of claim 1, wherein one $R^3$ is a hydroxyalkyl radical having from 1 to 6 carbon atoms.

4. The foamable composition of claim 2, wherein one $R^3$ is a hydroxyalkyl radical having from 1 to 6 carbon atoms.

5. The foamable composition of claim 1, wherein in formula (I) both the $R^3$ radicals are hydrocarbon radicals having a hydroxyl group.

6. The foamable composition of claim 2, wherein in formula (I) both the $R^3$ radicals are hydrocarbon radicals having a hydroxyl group.

7. The foamable composition of claim 5, wherein in formula (I) both the $R^3$ radicals are hydroxyalkyl radicals having from 1 to 6 carbon atoms.

8. The foamable composition of claim 1, further comprising at least one further component C) through H):
   (C) fillers,
   (D) emulsifiers,
   (E) physical blowing agents,
   (F) catalysts,
   (G) chemical blowing agents, and
   (H) additives,
   with the proviso that the foamable composition contains at least one blowing agent (E) and/or (G).

9. A process for producing a foamable composition of claim 8, comprising preparing a 2-part system wherein the two parts of the 2-part system contain all constituents in any desired combinations and mixing ratios, with the proviso that one part does not simultaneously contain siloxanes (A) and polyisocyanates (B) and/or the constituents (B) and (G).

10. A process for preparing a silicone-containing polyurethane foam, comprising adding at least one blowing agent to the foamable composition of claim 1 and allowing the composition to react to generate a silicone-containing polyurethane foam.

11. A silicon-containing polyurethane foam obtained by reacting a foamable composition of claim 1, the foamable composition further comprising
   (C) optionally filler(s),
   (D) optionally emulsifier(s),
   (E) optionally physical blowing agent(s),
   (F) optionally catalyst(s),
   (G) optionally chemical blowing agent(s), and
   (H) optionally further additives different from (A) through (G),
   wherein at least one blowing agent components (E) and/or (G) is present, and with the proviso that no further constituents other than (A) through (H) are present.

* * * * *